US012620907B2

(12) United States Patent
Carastro

(10) Patent No.: US 12,620,907 B2
(45) Date of Patent: May 5, 2026

(54) CONDUCTOR STRUCTURE

(71) Applicant: Danfoss Silicon Power GmbH, Flensburg (DE)

(72) Inventor: Fabio Carastro, Munich (DE)

(73) Assignee: DANFOSS SILICON POWER GMBH, Flensburg (DE)

( * ) Notice: Subject to any disclaimer, the term of this patent is extended or adjusted under 35 U.S.C. 154(b) by 162 days.

(21) Appl. No.: 18/547,378

(22) PCT Filed: Feb. 21, 2022

(86) PCT No.: PCT/EP2022/054198
§ 371 (c)(1),
(2) Date: Aug. 22, 2023

(87) PCT Pub. No.: WO2022/179966
PCT Pub. Date: Sep. 1, 2022

(65) Prior Publication Data
US 2024/0136937 A1 Apr. 25, 2024
US 2024/0235411 A9 Jul. 11, 2024

(30) Foreign Application Priority Data

Feb. 24, 2021 (DE) ...................... 10 2021 104 341.7

(51) Int. Cl.
*H02M 7/00* (2006.01)
*H01G 2/02* (2006.01)
(Continued)

(52) U.S. Cl.
CPC .............. *H02M 7/003* (2013.01); *H01G 2/02* (2013.01); *H01G 4/28* (2013.01); *H01G 4/30* (2013.01); *H01G 4/38* (2013.01); *H02M 7/537* (2013.01)

(58) Field of Classification Search
CPC .. H01G 2/02; H01G 4/28; H01G 4/30; H01G 4/38; H02M 7/003; H02M 7/537
See application file for complete search history.

(56) References Cited

U.S. PATENT DOCUMENTS 9,673,804 B2 6/2017 Hübbers et al.
2013/0100716 A1* 4/2013 Tong .................. H05K 7/20936
363/37

(Continued)

FOREIGN PATENT DOCUMENTS

CN 101420171 A 4/2009
CN 202034891 U 11/2011
(Continued)

OTHER PUBLICATIONS

International Search Report mailed on Jun. 15, 2022, in connection with corresponding International Application No. PCT/EP2022/054198; 3 pages.

*Primary Examiner* — Gary L Laxton
(74) *Attorney, Agent, or Firm* — McCormick, Paulding & Huber PLLC

(57) ABSTRACT

An apparatus is disclosed to include: a conductor structure (such as a busbar) comprising a first electrical connection and a second electrical connection; a first capacitor pair including a first capacitor and a second capacitor mounted directly opposite each other on opposite sides of the conductor structure, wherein the first and second capacitors each have a first electrical connector and a second electrical connector having a first electrical capacitance therebetween, and wherein the first and second capacitors each have a first side and a second side opposite the first side; a first connection arrangement connecting the first electrical connector of the first capacitor and the first electrical connector of the second capacitor to the first electrical connection of the conductor structure; and a second connection arrangement (Continued)

connecting the second electrical connector of the first capacitor and the second electrical connector of the second capacitor to the second electrical connection of the conductor structure. The first electrical connectors on the first side of the respective capacitors are aligned on the respective sides of the conductor structure and the second electrical connectors on the first side of the respective capacitors are aligned on the respective sides of the conductor structure.

19 Claims, 8 Drawing Sheets

(51) Int. Cl.

| | | |
|---|---|---|
| *H01G 4/28* | (2006.01) | |
| *H01G 4/30* | (2006.01) | |
| *H01G 4/38* | (2006.01) | |
| H02M 7/537 | (2006.01) | |

(56) References Cited

U.S. PATENT DOCUMENTS

| | | | |
|---|---|---|---|
| 2014/0110380 A1 | 4/2014 | Kamath et al. | |
| 2014/0242436 A1 | 8/2014 | Pizza et al. | |
| 2015/0103570 A1 | 4/2015 | Marahrens | |
| 2016/0211075 A1* | 7/2016 | Park | H01G 4/38 |

FOREIGN PATENT DOCUMENTS

| | | | |
|---|---|---|---|
| CN | 103607159 A | 2/2014 | |
| CN | 103986309 A | 8/2014 | |
| CN | 206163322 U | 5/2017 | |
| CN | 206163323 U | 5/2017 | |
| CN | 206819872 U | 12/2017 | |
| EP | 3 528 605 A1 | 8/2019 | |
| FR | 2 924 857 A1 | 6/2009 | |
| JP | 4968528 B2 | 7/2012 | |

* cited by examiner

CONDUCTOR STRUCTURE

CROSS-REFERENCE TO RELATED APPLICATIONS

This application is a National Stage application of International Patent Application No. PCT/EP2022/054198, filed on Feb. 21, 2022, which claims priority to German Patent Application No. 10 2021 104 341.7, filed on Feb. 24, 2021, each of which is hereby incorporated by reference in its entirety.

TECHNICAL FIELD

The present specification relates to a conductor structure, such as a busbar, including electrical capacitors.

BACKGROUND

Many configurations of electrical capacitor arrangements and conductor structures (e.g. busbars) are known in the art. However, there remains a need for further developments in this field.

SUMMARY

In a first aspect, this specification describes an apparatus comprising: a conductor structure (e.g. a busbar) comprising a first electrical connection and a second electrical connection; a first capacitor pair comprising a first capacitor and a second capacitor mounted directly opposite each other on opposite sides of the conductor structure, wherein the first and second capacitors each have a first electrical connector and a second electrical connector having a first electrical capacitance therebetween, and wherein the first and second capacitors each have a first side and a second side opposite the first side; a first connection arrangement connecting the first electrical connector of the first capacitor and the first electrical connector of the second capacitor to the first electrical connection of the conductor structure, wherein the first electrical connectors on the second side of the respective capacitors are aligned on the respective sides of the conductor structure; and a second connection arrangement connecting the second electrical connector of the first capacitor and the second electrical connector of the second capacitor to the second electrical connection of the conductor structure, wherein the second electrical connectors on the second side of the respective capacitors are aligned on the respective sides of the conductor structure. An apparatus comprising the structure defined above provides a symmetry of connections reflected about the plane of the conductor structure. That is to say, the electrical connectors of the first capacitor on one side of the conductor structure are matched by the electrical connectors of the second capacitor on the other side of the conductor structure. This symmetry in turn provides an electrical circuit of relatively low stray inductance, since current flow in one part may be matched by current flows in another. Such low-inductance circuits are of great advantage when, for example, high switching frequencies are used in the apparatus.

The conductor structure (which may be a busbar) may have a first layer in electrical contact with the first electrical connection of the conductor structure and a second layer in electrical contact with the second electrical connection of the conductor structure. One of the first and second layers may be a positive DC layer and the other of the first and second layers may be a negative DC layer. Furthermore, the conductor structure may have a third layer (e.g. an electrical ground layer) and a third electric connection, wherein the third layer is in electrical contact with the third electrical connection of the conductor structure.

The first and second electrical connectors of the capacitors may each be accessible from both the first and the second side of the respective capacitor, wherein the second sides of the capacitors are adjacent to the conductor structure.

The first electrical connector of each capacitor of the first capacitor pair may form part or all of a first electrical connector structure, wherein the first electrical connector structure of each capacitor extends within the respective capacitor from the first side of the capacitor to the second side of the capacitor. Furthermore, each capacitor of the first capacitor pair may comprise a hole extending axially within the capacitor from the first side to the second side, wherein the first electrical connector structure is provided within said hole. The first electrical connector structure may extend along a central axis of the respective capacitor.

In some example embodiments, the second electrical connector is at least partially provided on an exterior of a casing of the respective electrical capacitor, such that the second electrical connector is accessible from both the first and the second sides of the capacitor. The second electrical connector may have multiple sections each separately accessible from both the first and second sides of the capacitor, wherein the multiple sections are provided symmetrically about the respective capacitor. For example, the multiple sections of the second electrical connector may meet at a flange that extends around one end of the respective capacitor.

Some example embodiments further comprise: a second capacitor pair comprising a first capacitor and a second capacitor mounted directly opposite each other on opposite sides of the conductor structure, wherein the first and second capacitors of the second capacitor pair each have a first electrical connector and a second electrical connector having a second electrical capacitance therebetween; a third connection arrangement connecting the first electrical connector of the first capacitor and the first electrical connector of the second capacitor of the second capacitor pair to the first electrical connection of the conductor structure, wherein the first electrical connectors on the first side of the respective capacitors are aligned on the respective sides of the conductor structure; and a fourth connection arrangement connecting the second electrical connector of the first capacitor and the second electrical connector of the second capacitor of the second capacitor pair to the second electrical connection of the conductor structure, wherein the second electrical connectors on the first side of the respective capacitors are aligned on the respective sides of the conductor structure. The first and second electrical connectors of the second capacitor pair may be accessible from both a first and a second side of the respective capacitor. The first and second sides of the capacitor(s) may be adjacent to the conductor structure.

Some example embodiments further comprise: a first switching component having a first terminal in electrical contact with the first electrical connection of the conductor structure and a second terminal in electrical contact with a first output; a second switching component having a first terminal in electrical contact with the first output and a second terminal in electrical contact with the second electrical connection of the conductor structure; and a control circuit for controlling the switching of the first and second switching components. By way of example, the said apparatus may be power module.

Some example embodiments further comprise: a plurality of first switching components, each having a first terminal in electrical contact with the first electrical connection of the conductor structure and a second terminal in electrical contact with one of a plurality of outputs; a plurality of second switching components, each having a first terminal in electrical contact with one of the plurality of output and a second terminal in electrical contact with the second electrical connection of the conductor structure; and a control circuit for controlling the switching of the plurality of switching components.

In a second aspect, this specification describes an inverter comprising: a rectifier for converting an AC power source into a DC signal; a DC storage capacitor; and an apparatus as described above with reference to the first aspect, wherein the DC signal is provided across the first and second electrical connections of the conductor structure.

BRIEF DESCRIPTION OF THE DRAWINGS

Example embodiments will now be described, by way of example only, with reference to the following schematic drawings, in which.

DETAILED DESCRIPTION

Figure 1:
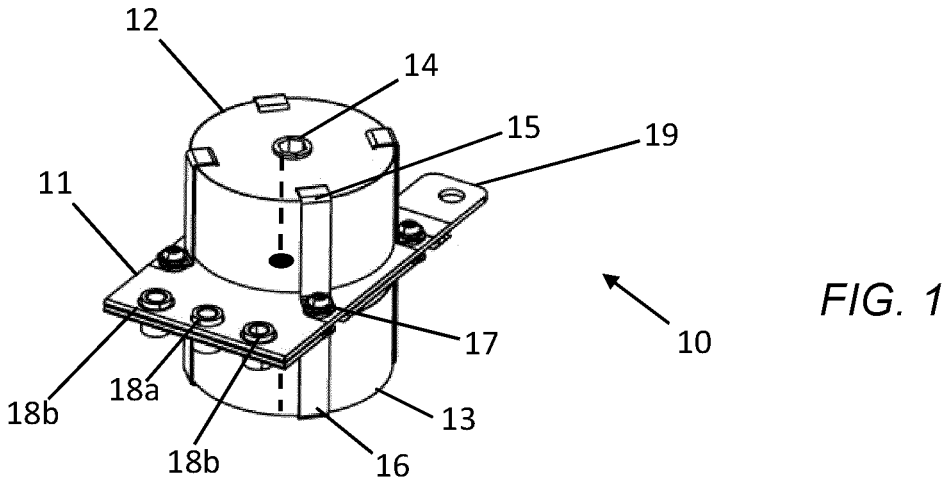
FIG. 1 is a view from above of an electrical capacitor arrangement in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

In some systems, such as an inverter or frequency converter systems, a direct current (DC) voltage supply may be supplied to one or more switching modules (e.g. electronic switches) having DC inputs, and an alternating current (AC) output of the switching modules may be controlled to have desired frequency and/or voltage characteristics. It may be desirable to have a certain capacitance inserted between the DC inputs provided to the switching modules in order to smooth and stabilise the voltage, as significant currents may flow through the capacitors. Moreover, in semiconductor switching arrangements comprising wide-bandgap semiconductors (e.g. using silicon carbide (SiC) or gallium nitride (GaN) instead of silicon (Si)), which allows high frequencies of switching (e.g. for use in frequency converters), structures with low inductance may assist in providing low noise systems having low switching transients.

A capacitor arrangement comprising multiple capacitors connecting to a DC supply may be provided by using a conductor structure, such as a DC busbar, with capacitors mounted on one side of the busbar. As discussed in detail below, such a busbar may be a planar busbar comprising a positive conductor plate and a negative conductor plate, with an insulating layer therebetween. One way of reducing space occupied by the circuit elements may be to mount capacitors on either side of the busbar. However, mounting capacitors on either side of the busbar in a symmetric arrangement may be difficult. As the electrical connections must be connected to the side of the busbar opposite to the side where the capacitor is placed, it may not feasible to mount some example capacitors directly opposite each other (i.e. having the same central axis on either side of the busbar), since the soldering to the positive connections on the opposite side of the busbar may not be achievable due to the capacitor on the opposite side covering the positive connection on the busbar. Therefore, such capacitors may typically be arranged such that capacitors on opposite sides of the busbar are not directly aligned with each other, thus being asymmetrical, which may lead to undesirable asymmetrical current flows.

The example embodiments described below seek to provide capacitor arrangements having symmetry, and thus allowing low inductance.

FIG. 1 is a view from above of an electrical capacitor arrangement, indicated generally by the reference numeral 10, in accordance with an example embodiment. The capacitor arrangement comprises a conductor structure 11 (such as a busbar), and a first capacitor pair comprising a first capacitor 12 and a second capacitor 13 mounted directly opposite each other on opposite sides of the conductor structure 11.

In one example embodiment, the conductor structure 11 comprises a first conductor plate and a second conductor plate with an insulating layer separating the first and second conductor plates. In the configuration shown in FIG. 1, the first (lower) conductor plate has a positive DC connection (not visible in FIG. 1) and the second (upper) conductor plate has a negative DC connection 19. Thus, the conductor structure 11 is configured to receive a DC voltage between the first and second conductor plates. The first and second capacitors 12 and 13 are provided across the DC inputs, for example for filtering purposes.

The electrical capacitor arrangement 10 further comprises a first electrical connection 18a and a second pair of electrical connections 18b. The first electrical connection 18a is electrically connected to the first (lower) conductor plate and the second pair of electrical connections 18b are connected to the second (upper) conductor plate. Thus, in the configuration described above, the first electrical connection 18a can be used to provide a positive DC voltage and the second pair of electrical connections 18b can be used to provide a negative DC voltage.

The first capacitor 12 comprises a first electrical connector 14 and a second electrical connector 15. Similarly, the second capacitor 13 comprises a first electrical connector (not shown; positioned on the bottom side of the conductor structure 11) and a second electrical connector 16. Each capacitor comprises a first side and a second side, the second side being opposite the first side (e.g. the second side being the side of the capacitors that are mounted on the conductor structure 11). The first electrical connector 14 of the first capacitor 12 and the first electrical connector of the second capacitor 13 may be provided at a common axis (e.g. central axis) of the capacitors 12 and 13. The second electrical connectors 15 and 16 may be provided on the outer surface of the capacitors 12 and 13 respectively. The second electrical connectors 15 and 16 may be provided in multiple sections (e.g. four sections shown on the outer surface of the first capacitor 12).

A first connection arrangement may be provided for connecting the first electrical connector 14 of the first capacitor 12 and the first electrical connector of the second capacitor 13 to the first (lower) conductor plate of the conductor structure 11 and hence to the first electrical connection 18a. The first electrical connectors on the second side of the respective capacitors are aligned on the respective sides (e.g. opposite sides) of the conductor structure 11.

The second electrical connector 15 of the first capacitor 12 and the second electrical connector 16 of the second capacitor 13 may be connected to the second (lower conductor plate of the conductor structure 11 and hence to the second pair of electrical connections 18b. The second electrical connectors 15 and 16 of the first and second capacitors are aligned on the respective sides (e.g. opposite sides) of the conductor structure 11. In one example, the second connection arrangement may comprise bolts 17 that affix the second electrical connectors 15 and 16 to the conductor structure 11, such that the second electrical connectors 15 and 16 are connected to a conductor plate of the conductor structure 11 that is associated with the second electrical connections 18b.

A single bolt 17 may connect both the second electrical connectors 15 and 16 of a capacitor pair to the conductor structure 11. Hence, the second electrical connector 15 of the first capacitor 12 may lie opposite the second electrical connector 16 of the second capacitor 13 at the second sides of the first and second capacitor 12, 13 on two sides of the conductor structure 11.

Furthermore, the first electrical connector 14 of the first capacitor 12 may oppose the first electrical connector of the second capacitor 13 at the second sides of the first and second capacitor 12, 13 on two sides of the conductor structure 11.

It should be appreciated that the capacitor arrangement 10 allows the capacitors 12 and 13 to be arranged directly opposite to each other having a common axis (e.g. the same central axis), and connected to each other and to the corresponding conductor plate of the conductor structure 11. In this way, a symmetrical capacitor arrangement is provided, thus enabling relatively low inductance.

The symmetrical capacitor arrangement comprises a symmetric arrangement of the first electrical connector 14 of the first capacitor 12 and the first electrical connector of the second capacitor 13 with respect to the conductor structure 11. The first electrical connector 14 of the first capacitor 12 and the first electrical connector of the second capacitor 13 may be aligned along a second common axis.

Furthermore, the symmetrical capacitor arrangement comprises a symmetric arrangement of the second electrical connector 15 of the first capacitor 12 and the second electrical connector 16 of the second capacitor 13 with respect to the conductor structure 11. The second electrical connector 15 of the first capacitor 12 and the second electrical connector 16 of the second capacitor 13 may be aligned along a third common axis.

Figure 2:
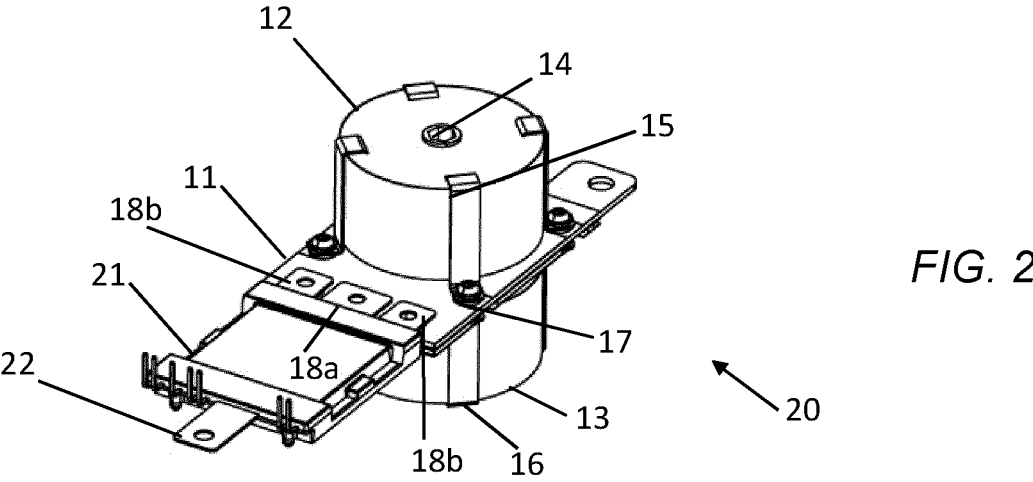
FIG. 2 is a view from above of a circuit in accordance with an example embodiment.

FIG. 2 is a view from above of a circuit, indicated generally by the reference numeral 20, in accordance with an example embodiment. The circuit 20 comprises the conductor structure 11 (comprising the first electrical connection 18a, the second pair of electrical connections 18b, the positive DC connection (not visible) and the negative DC connection 19), capacitor 12 (comprising first and second electrical connectors 14 and 15), and capacitor 13 (comprising the first electrical connector (not shown) and the second electrical connector 16), similar to the arrangement provided with reference to FIG. 1.

The circuit 20 further comprises a DC power module 21. For example, the DC power module 21 may act as a switching module. The DC power module may include a control module and sensor pins and may include a cooling arrangement. The DC power module receives DC power from the conductor structure 11 and may comprise electrical components that enable it to switch current supplied from the electrical connections 18a and 18b and supply an output at an electrical connector 22.

In the circuit 20, the first and second capacitors 12 and 13 are provided close to the DC power module 21 and can be used for filtering switching noise from the DC power module.

Figure 3:
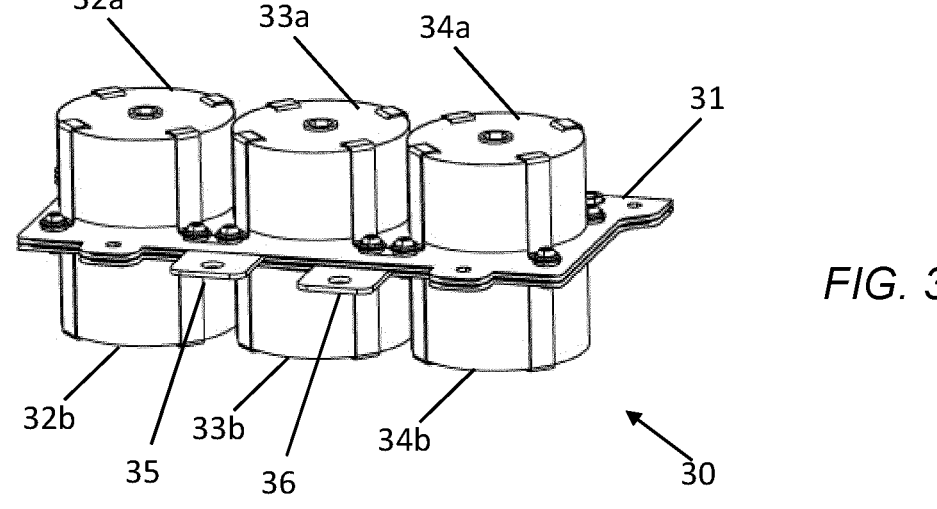
FIG. 3 is a view of an electrical capacitor arrangement in accordance with an example embodiment.

FIG. 3 is a view of an electrical capacitor arrangement, indicated generally by the reference numeral 30, in accordance with an example embodiment. The capacitor arrangement 30 comprises a plurality of capacitor pairs 32, 33, and 34, arranged in parallel on either side of a conductor structure 31. The capacitor pair 32 comprises a first capacitor 32a and a second capacitor 32b, similar to the first and second capacitors 12 and 13 described above with reference to FIGS. 1 and 2. The first and second capacitors 32a and 32b are mounted directly opposite to each other, having a common axis (e.g. central axis) on opposite sides of the conductor structure 31. The capacitor pairs 33 and 34 are also mounted similarly on opposite sides of the conductor structure 31, where the capacitors 33a and 33b have a common axis, and the capacitors 34a and 34b have a common axis.

The electrical capacitor arrangement 30 shows a negative DC connection 35 to a first (upper) layer of the conductor structure 31 and a positive DC connection 36 to a second (lower) layer of the conductor structure. (The negative DC connection 35 corresponds to the negative DC connection 19 of the capacitor arrangement 10, in which the positive DC connection was not visible).

Each capacitor of the electrical capacitor arrangement 30 also comprises a first electrical connection and a second pair of electrical connections (corresponding to the connections 18a and 18b described above) that are not visible in FIG. 3. Those connections can be used to provide DC power to power modules, as discussed further below.

Figure 4:
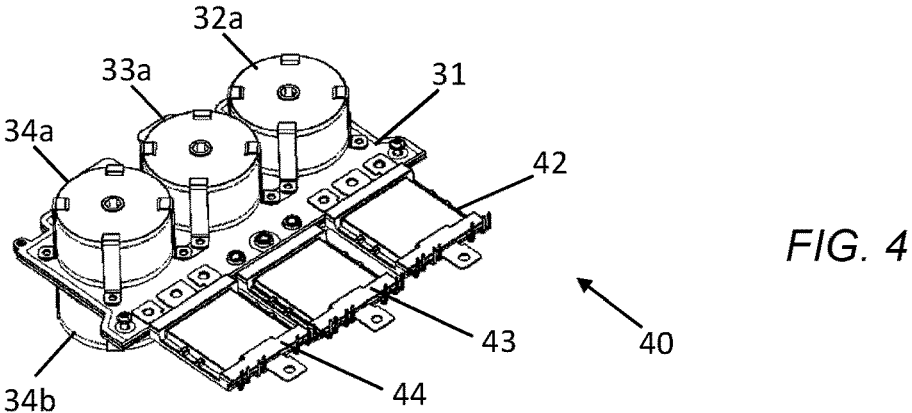
FIG. 4 is a view from above of a circuit in accordance with an example embodiment.

FIG. 4 is a view from above of a circuit, indicated generally by the reference numeral 40, in accordance with an example embodiment. The circuit 40 comprises the elements 31 to 34 of the circuit 30 as described above with reference to FIG. 3 (and the elements 35 and 36 that are not visible in FIG. 4). The circuit 40 comprises the first capacitor pair 32 including the capacitor 32a and capacitor 32b, and the second capacitor pair 33 including the capacitor 33a and capacitor 33b (although the capacitors 32b and 33b are not shown in this view). The circuit also comprises the third capacitor pair 34 including the capacitor 34a and capacitor 34b. The capacitors 32a, 33a, and 34a, are mounted directly opposite to the capacitors 32b, 33b, and 34b respectively, having a common axis (e.g. central axis) on opposite sides of the conductor structure 31.

The circuit 40 further comprises DC power modules 42, 43 and 44 (e.g. similar to the DC power module 21 described with reference to FIG. 2), connected to the capacitor pairs 32, 33, and 34 via the conductor structure 31.

As discussed above with respect to the DC power module 21, each of the DC power module 42, 43, 44 may act as a switching module (e.g. as part of an inverter). The DC power modules may include separate control modules and sensor pins and may include cooling arrangements. The DC power module receives DC power from the conductor structure 31.

In the circuit 40, the capacitor pairs are each provided in close proximity to one of the DC power modules and can be used for filtering switching noise from the respective power module.

In some example embodiments, the first and second electrical connectors of a capacitor (e.g. 12, 13, 32, 33, 34) are each accessible from both a first and a second side of the respective capacitor, where the second sides of the capacitors are adjacent to the conductor structure (11, 31). This will be described in further detail below with reference to FIGS. 8 to 13.

Figure 5:
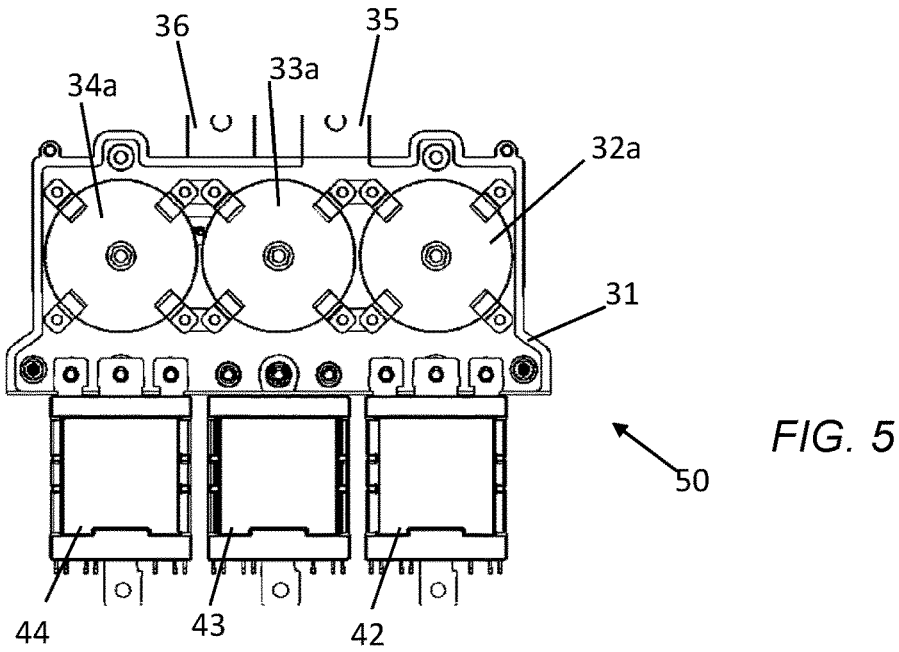
FIG. 5 is a plan view of a circuit in accordance with an example embodiment.

FIG. 5 is a plan view of a circuit, indicated generally by the reference numeral 50, in accordance with an example embodiment. The circuit 50 comprises the elements of circuit 40 as described above with reference to FIG. 4. In the plan view, the elements of circuit 50 that are shown comprise the conductor structure 31, the capacitors 32a, 33a, 34a, the negative DC connection 35, the positive DC connection 36 and DC power modules 42, 43, and 44.

Figure 6:
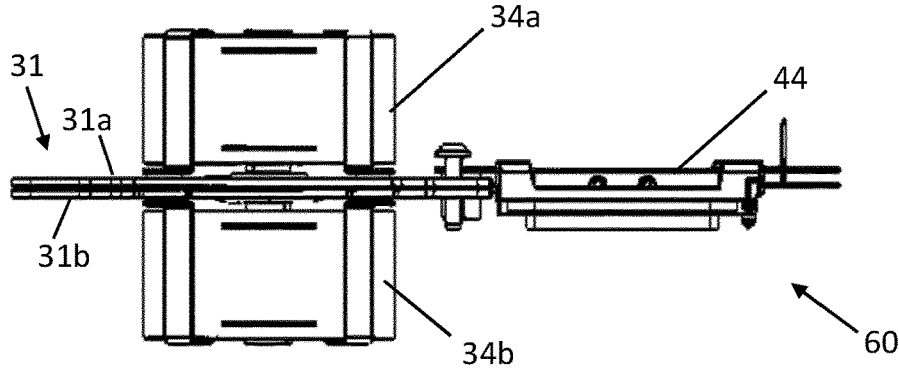
FIG. 6 is a side view of a circuit in accordance with an example embodiment.

FIG. 6 is a side view of a circuit, indicated generally by the reference numeral 60, in accordance with an example embodiment. The circuit 60 shows the side view of the capacitors 34a and 34b, the conductor structure 31, and the DC power module 44, as described above with reference to FIGS. 4 and 5. The capacitors 34a and 34b are mounted directly opposite to each other (e.g. having a common axis) on opposite sides of the conductor structure 31.

As shown in FIG. 6, the conductor structure 31 has a first (upper) layer 31a and a second (lower) layer 31b. The first layer 31a may be in electrical contact with second electrical connections (e.g. the pair of electrical connections 18b described with reference to FIGS. 1 and 2). Similarly, the second layer 31b may be in electrical contact with a first electrical connection (e.g. the electrical connection 18a described with reference to FIGS. 1 and 2). The first and second layers 31a and 31b may be separated by an insulating layer. In one example, one of the first and second layers (the lower layer in the examples described above) is a positive DC layer and the other of the first and second layers (the upper layer in the examples described above) is a negative DC layer. Of course, in other embodiments, different DC connections could be provided.

Figures 7, 8, 9:
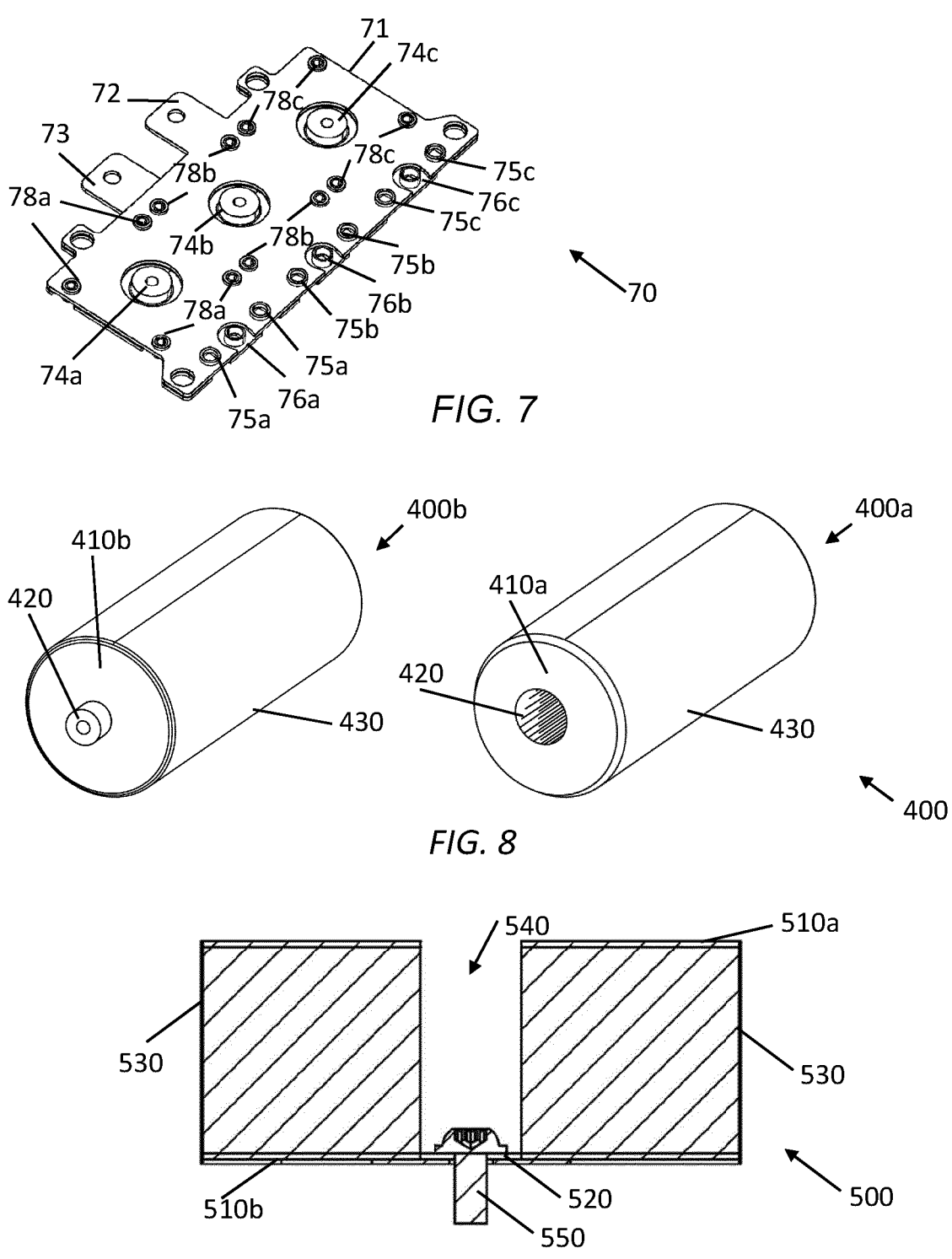
FIG. 7 shows a busbar used in example embodiments.
FIG. 8 shows an electrical capacitor in accordance with an example embodiment.
FIGS. 9 to 11 are cross-sections of electrical capacitors in accordance with example embodiments.

FIG. 7 shows a busbar, indicated generally by the reference numeral 70, used in example embodiments. The busbar 70 may be used to implement the conductor structures (11, 31) described above with reference to FIGS. 1 to 6. The busbar 70 comprises a first (upper) layer 71 (e.g. a first conductor plate), a second (lower) layer (e.g. second conductor plate, not shown), and an insulating layer therebetween.

The first layer 71 of the busbar 70 includes a first DC connection 72 (which may provide a negative DC connection, as discussed above). The second layer of the busbar 70 includes a second DC connection 73 (which may provide a positive DC connection, as discussed above).

The busbar 70 further comprise first electrical contacts 74a, 74b, and 74c, and second electrical contacts 78a, 78b, and 78c. Each of the electrical contacts 74 may be configured to connect to a first electrical connector (e.g. first electrical connector 14 described with reference to FIG. 2) of a pair of capacitors (e.g. capacitors 12 and 13), which pair may comprise a first capacitor mounted on a first side of the busbar 70 (e.g. on the conductor plate 71), and a second capacitor mounted directly opposite to the first capacitor on a second side of the busbar 70 (e.g. on the second conductor plate). The second electrical contacts 78a may be configured to connect to multiple sections of a second electrical connector (e.g. second electrical connectors 15) of the first capacitor and a second electrical connector (e.g. second electrical connectors 16) of the second capacitor. The multiple sections may each be separately accessible from both the first and second sides of the capacitor, wherein the multiple sections are provided symmetrically about the respective capacitor. By way of example, four such second electrical contacts 78a (for connection to one pair of capacitors) are shown, but other numbers of second electrical connectors are possible.

The busbar 70 further comprises first electrical connections 75a, 75b and 75c, and second electrical connection 76a, 76b and 76c, for connection to DC power modules as discussed above. The first electrical connections 75 may be associated with the first conductor plate 71 (and may therefore provide negative DC voltages to the respective power modules) and the second electrical connections 76 may be associated with the second conductor plate (and may therefore provide positive DC voltages to the respective power modules).

As discussed further below, in some variants, a busbar may comprise a third layer that is connected to electrical ground, such an electrical ground connection may be made to the respective DC power modules.

As indicated above, a number of capacitor arrangements may be provided for use with the embodiments described above. Some examples are discussed below.

FIG. 8 shows an electrical capacitor, indicated generally by the reference numeral 400, in accordance with an example embodiment. The capacitor 400 may be similar to the capacitors 12, 13, 32, 33, and 34 described above with reference to FIGS. 1 to 6. The capacitor 400 is shown in a first orientation 400a and a second orientation 400b, thus showing a first side 410a and a second side 410b of the capacitor 400 respectively. For example, the capacitor 400 may be placed on a conductor structure (11, 31) such that the second side 410b is adjacent to the conductor structure. The capacitor 400 comprises a first electrical connector structure 420 and a second electrical connector structure 430, such that the first and second electrical connector structures 420 and 430 have a capacitance therebetween. The first electrical connector 420 shown on the first side 410a extends within (e.g. axially within) the capacitor 400 from the first side 410a of the capacitor 400 to the second side 41b of the capacitor 400, such that the first electrical connector structure 420 is accessible from both the first and the second side 410a and 410b of the capacitor 400. The second connector structure 430 may be formed by the housing (e.g. metal can) of the capacitor 400.

In an example embodiment, the first electrical connector structure 420 comprises a hole that extends within the capacitor 400 (e.g. along the central axis or another axis) from the first side 410a to the second side 410b, such that the first electrical connector 420 is provided within said hole. For example, the second orientation 400b shows a central axial positive terminal (first electrical connector 420) at the second side 410b of the capacitor 400, and the first orientation 400a shows an opening at the first side 410a (opposite side of the second side 410b) of the capacitor 400 which allows access to the first electrical connector 420 from the first side 410a. Therefore, the first electrical connector 420 is accessible from both the first side 410a and the second side 410b of the capacitor 400.

As described above, capacitor arrangements with increased symmetry may provide reduced inductance, which may be desirable for semiconductor systems with high switching frequencies. The capacitor 400 allows the first electrical connector 420, positioned on a central axis of the capacitor, to be accessed from either side of the capacitor, for example, for purposes of soldering, welding, screwing, or otherwise affixing from both sides of the capacitor through the hole running across the length of the capacitor. This may enable mounting two capacitors on either side of a conductor structure (e.g. a busbar) along a single central axis (e.g. directly opposite each other), and still allow the electrical connectors of the respective capacitors to be connected to a positive connection.

In one example, the first electrical connector 420 may be placed anywhere along the central axis of the capacitor 400, such that it is not limited to be placed on the second side 410b.

FIG. 9 is a cross-section of a capacitor, indicated generally by the reference numeral 500, in accordance with an example embodiment. The capacitor 500, which is similar to the capacitor 400 (and capacitors 12, 13, 32, 33, 34) described above, comprises a first side 510a (e.g. similar to the first side 410a), a second side 510b (e.g. similar to the second side 410b), a central hole 540, a first electrical connector 520 provided at a central axis of the capacitor 500, and a second connector 530 provided by a wall (e.g. metal can housing) surrounding the capacitor 500. The capacitor 500 may be mounted on a conductor (e.g. a busbar) by means of a bolt 550 for connecting the first electrical connector 520 to a connection (e.g. a positive connection) on the conductor. For example, the bolt 550 may be affixed (e.g. by bolting or soldering) to the conductor, thus allowing both the first side 510a and/or the second side 510b of the capacitor to be connected to the positive connection. The first electrical connector 520 may either comprise a hole which is clamped using the bolt 550, or may be a threaded hole through which the bolt 550 may be screwed in.

In on example, the conductor is a busbar structure (e.g. similar to the busbar 11, 31, 70), which comprises two conductor plates, one at a positive potential and one at a negative potential, with an insulator in between. The conductor plates may comprise holes, for enabling making connections with electrical components such as capacitors, or for allowing a connection to pass through the hole to the other plate.

In one example, the second electrical connector 530 is accessible from both the first and the second sides 510a and 510b of the capacitor. This may be enabled by the second electrical connector 530 being formed along the outer surface of the capacitor (e.g. the metal can housing). The second electrical connector 530 may therefore be at least partially provided on an exterior of a casing of the electrical capacitor 500, such that the second electrical connector is accessible from both the first and the second side 510a and 510b of the capacitor.

Figure 10:
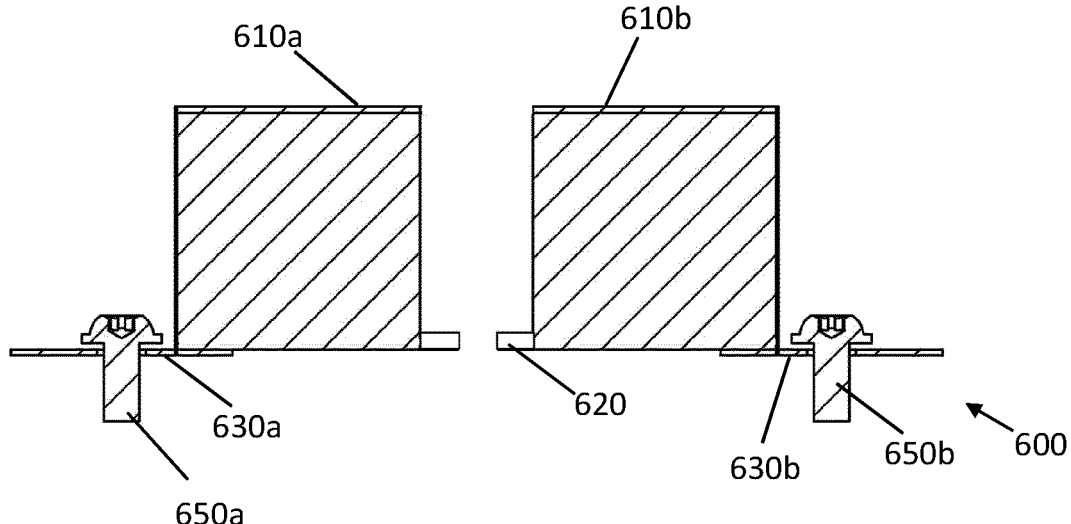

FIG. 10 is a cross-section of an electrical capacitor, indicated generally by the reference numeral 600, in accordance with an example embodiment. The capacitor 600 (which is similar to the capacitors 12, 13, 32, 33, 34, 400 and 500) has a first side 610a and a second side 610b, and further comprises a first electrical connection 620 and second electrical connections 630a and 630b. The first electrical connection 620 may be similar to the first electrical connection 520, such that it may provide a positive connection by being connected to a connection (e.g. a positive DC connection) on a conductor (e.g. a busbar), by a connection means (e.g. a bolt). The second electrical connections 630a and 630b may be configured to provide a negative connection. For example, the second electrical connections 630a and 630b may be provided as a flange such that one or more bolts (e.g. bolts 650a and 650b) may be used for connecting the second electrical connection to a negative connection on a conductor (e.g. a busbar).

In one example, the first electrical connector (14, 420, 520, 620) of each capacitor of the first capacitor pair forms part or all of a first electrical connector structure, which is described further below with reference to FIG. 13. The first electrical connector structure of each capacitor extends within the respective capacitor from the first side of the capacitor to the second side of the capacitor.

Figure 11:
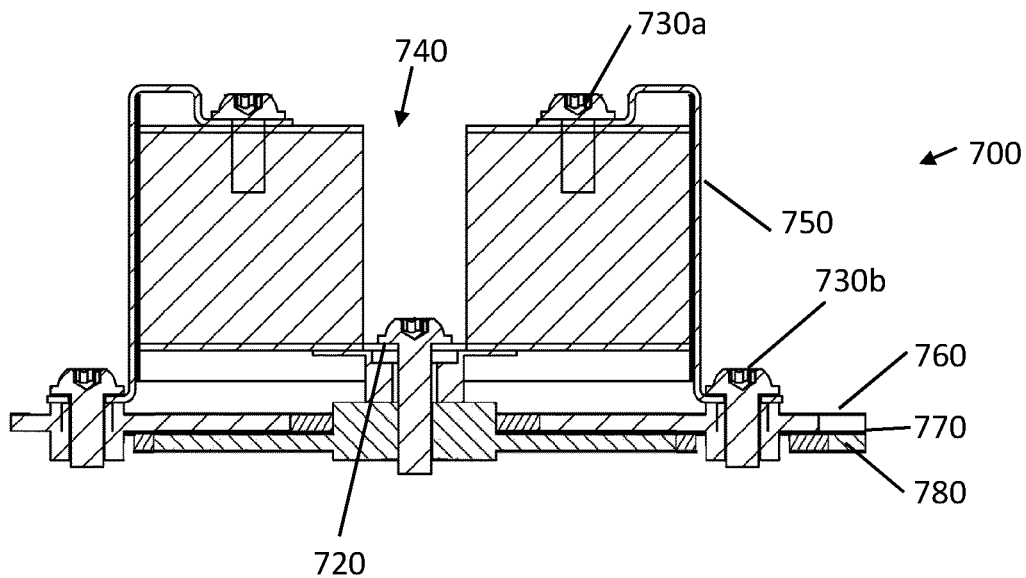

FIG. 11 is a cross-section of an electrical capacitor, indicated generally by the reference numeral 700 (similar to the capacitors 12, 13, 32, 33, 34, 400, 500, and 600), in accordance with an example embodiment. The capacitor 700 comprises a first electrical connector 720, and a second electrical connector 730a (e.g. similar to the second connection arrangement 17 described with reference to FIG. 1). The capacitor 700 may be mounted on a conductor structure (e.g. a busbar) comprising a first conductor plate 760 at a negative potential, a second conductor plate 780 at a positive potential, and an insulator 770 between the first and second conductor plates 760 and 780. The second electrical connector 730a may be configured to connect to provide a negative connection, for example, by means of a bracket structure 750. The bracket structure 750 may be affixed at one end to the second electrical connector 730a and may be affixed at another end to the conductor 760 for providing a negative connection to the second electrical connector 730a. Similarly, the first electrical connector 720 may be connected to a positive connection provided by the second conductor plate 780, for example, using a bolt for connecting the first electrical connector 720 to the second conductor plate 780. The first electrical connector 720 may be separated from the first conductor plate 760 (negative connection) by means of an insulator. In one example, the capacitor 700 may comprise a plurality of second electrical connectors 73a and bracket structures 750, as described above with reference to FIGS. 1 to 5.

Figure 12:
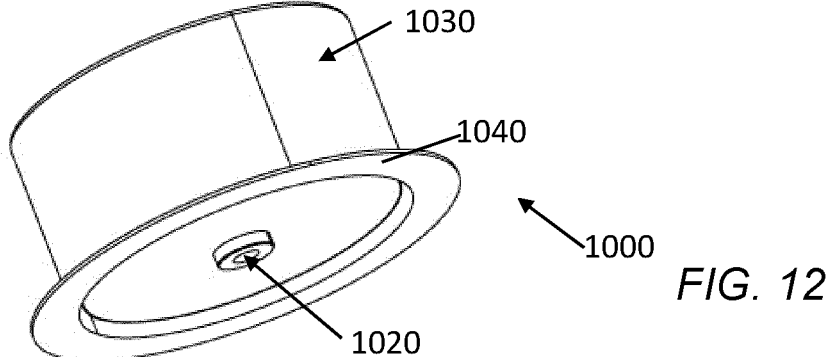
FIG. 12 shows an electrical capacitor in accordance with an example embodiment.

FIG. 12 shows an electrical capacitor, indicated generally by the reference numeral 1000, in accordance with an example embodiment. The capacitor 1000 comprises a first electrical connector 1020 and a second electrical connector 1030. The second electrical connector 1030 may comprise multiple sections that meet at a flange 1040 that extends around the bottom end of the capacitor 1000. Therefore, the second electrical connector 1030 may comprise a cylindrical structure (rather than four parts as comprised by the capacitors 12, 13, 32, 33, 34 described above) on the outer surface of the capacitor, and may comprise a single flange that is provided as a circular structure surrounding the capacitor 100 and can be used to mount the capacitor on a conductor. It should be noted that the described capacitors of FIGS. 1 to 6 could be combined, with multiple second electrical connectors being electrically connected to a flange 1040.

Figure 13:
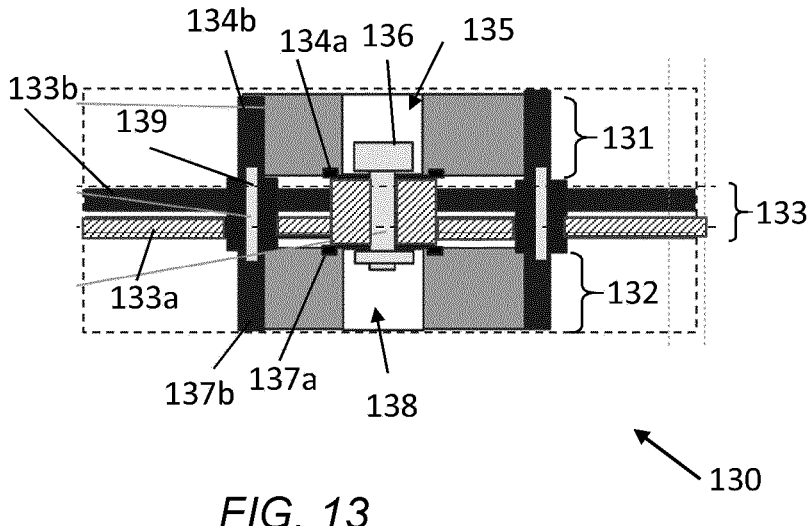
FIGS. 13 to 15 show circuits in accordance with example embodiments.

FIG. 13 shows a circuit, indicated generally by the reference numeral 130, including capacitors in accordance with an example embodiment. The circuit 130 comprises a capacitor 131, a capacitor 132, and a conductor structure 133. The circuit 130 is shown in a cross-sectional view, such that the cross section of the capacitors can be seen.

In one example, the capacitors 131 and 132 form a capacitor pair, and each capacitor of the first capacitor pair comprises a hole (135 and 138 respectively) extending axially within the respective capacitor (131 and 132) from the first side to the second side, wherein the first electrical connector structure (134a, 137a) is provided within said hole. For example, the first electrical connector structure (134a, 137a) extends along a central axis of the respective capacitor.

For example, the capacitors 131 and 132 are mounted on opposite sides of the busbar 133, such that the capacitors 131 and 132 are aligned with each other having a common central axis (e.g. the axis extending from hole 135 of the capacitor 131 to hole 138 of the capacitor 132). The capacitor 131 comprises a first electrical connector structure 134a, and a second electrical connector structure 134b. The capacitor 132 comprises a first electrical connector 137a and a second electrical connector 137b. The conductor structure 133 comprises a conductor plate 133a for connecting to a positive connection and a conductor plate 133b for connecting to a negative connection.

The first electrical connector 134a of the capacitor 131 and the first electrical connector 137a of the capacitor 132 may be connected to the conductor plate 133a by means of a bolt 136, which bolt 136 may be fastened through the holes 135 and 138 to both the capacitors 131 and 132. Thus, the first electrical connectors 134a and 137a are connected to a positive connection.

The second electrical connector 134b of the capacitor 131 and the second electrical connector 137b of the capacitor 132 may be connected to the conductor plate 133b by means of a bolt 139, thus connecting the second electrical connectors 134 and 137 to a negative connection. As described above with reference to FIGS. 1 to 12, the capacitor 131 or 132 may comprise a plurality of sections of the second electrical connector, which sections may be separate or may be joined with a single flange surrounding the capacitor.

In one example, the first electrical connector structure 134a of the capacitor 131 extends within the capacitor 131 from the first side of the capacitor 131 (e.g. top side) to the second side of the capacitor 131 (e.g. the bottom side adjacent to the conductor structure). Similarly, the first electrical connector structure 137a of the capacitor 132 extends within the capacitor 132 from the first side of the capacitor 132 (e.g. bottom side) to the second side of the capacitor 132 (e.g. the side adjacent to the conductor structure).

Figure 14:
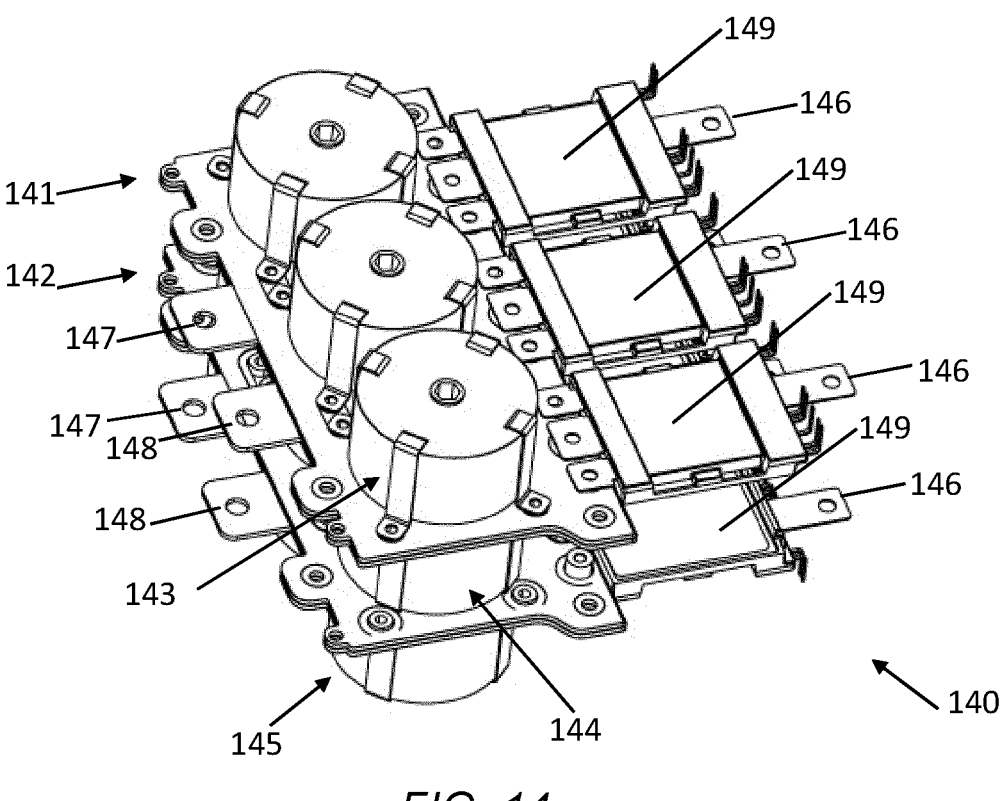

FIG. 14 shows a circuit, indicated generally by the reference numeral 140, in accordance with an example embodiment. The circuit 140 comprises a first conductor structure 141 (e.g. similar to conductor structures 11 and 31) and a second conductor structure 142. A plurality of capacitors may be arranged in a plurality of levels on one or both of the second conductor structure 142. Corresponding layers of DC power modules 149 are provided with the first and second conductor structures 141 and 142. Terminals 147 and

148 are used for the two DC power inputs, and the terminals 146 provide the AC outputs from the power modules 149. For example, a plurality of capacitors in a first capacitor level 143 are mounted on a first side of the first conductor structure 141; a plurality of capacitors in a second capacitor level 144 are mounted on a second side of the first conductor structure 141 and on a first side of the second conductor structure 142; and a plurality of capacitors in a third capacitor level 145 are mounted on a second side of the second conductor structure 142. The plurality of capacitors in the plurality of levels are mounted symmetrically opposite to each other. As such, there may be multiple levels of capacitors and conductor structures, such that the embodiments are not limited to having only two levels of capacitors as described with reference to FIGS. 1 to 6.

Figure 15:
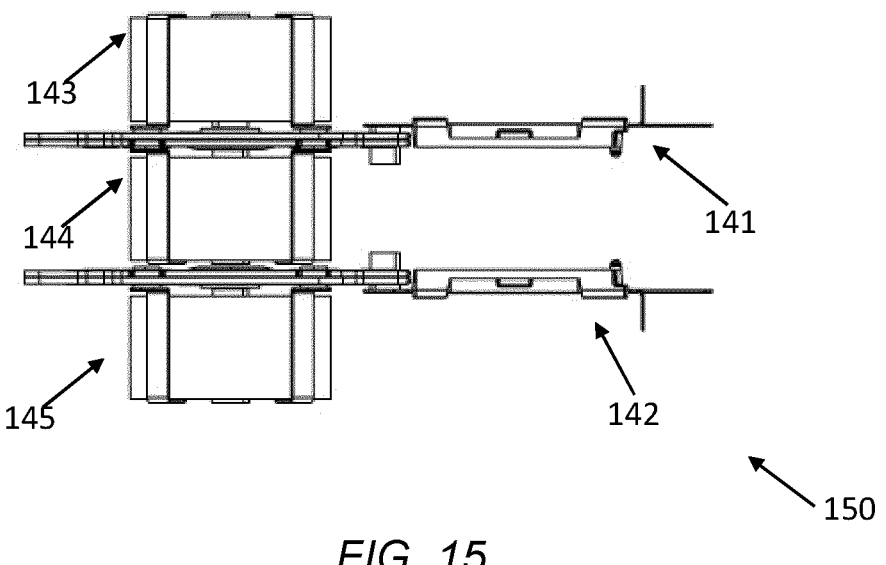

FIG. 15 shows a side view, indicated generally by the reference numeral 150, of the circuit 140 in accordance with an example embodiment. The side view 150 shows the first and second conductor structure 141 and 142, and the first, second, and third levels of capacitors 143, 144, and 145, as mounted on one or more of the conductor structures, as described above with reference to FIG. 14.

Figure 16:
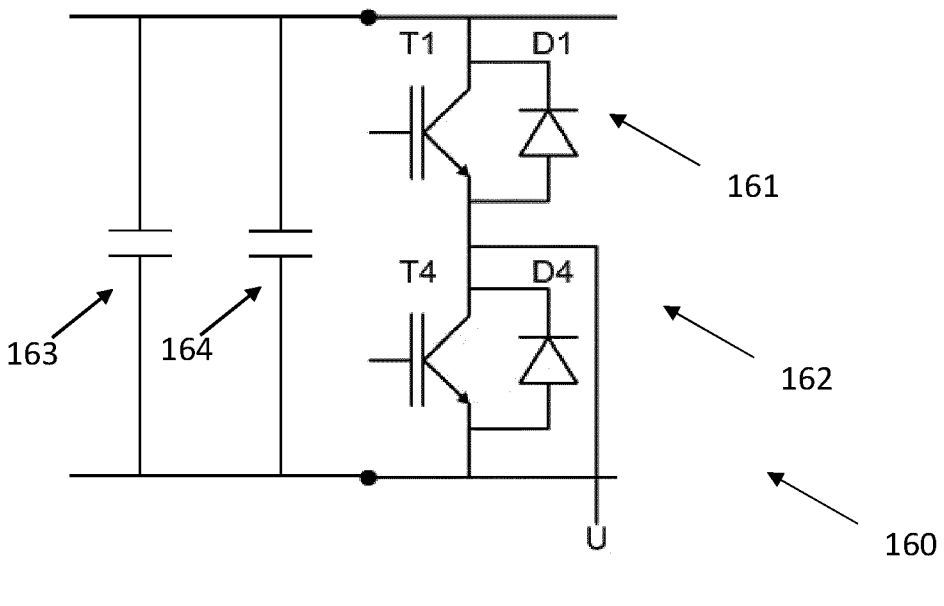
FIG. 16 shows a switching module used in example embodiment.

FIG. 16 shows a switching module, indicated generally by the reference numeral 160, used in example embodiment. The switching module 160 comprises a first switching component 161, having a first terminal in electrical contact with the first electrical connection of the conductor structure and a second terminal in electrical contact with a first output. The switching module 160 further comprises a second switching component 162 having a first terminal in electrical contact with the first output and a second terminal in electrical contact with the second electrical connection of the conductor structure. The switching module 160 may further comprise a control circuit for controlling the switching of the first and second switching components.

A first capacitor 163 and a second capacitor 164 are provided in parallel between the DC connections of the switching module 160. The first and second capacitors may form a pair of capacitors that are provided on either side of a busbar or similar arrangement. Providing pairs of capacitors in parallel assists with the symmetry of the circuitry, as discussed above.

In an example embodiment, the switching module 160 may comprise a plurality of first switching components 161, each having a first terminal in electrical contact with the first electrical connection of the conductor structure and a second terminal in electrical contact with one of a plurality of outputs; a plurality of second switching components 162, each having a first terminal in electrical contact with one of the plurality of output and a second terminal in electrical contact with the second electrical connection of the conductor structure; and a control circuit for controlling the switching of the plurality of switching components. Where a plurality of first and second switching components is provided, a separate capacitor pair may be provided for each of the plurality of first and second switching components.

At least some of the example embodiments described above include one or more power modules that switch between positive and negative DC power supplies. This is not essential to all example embodiments. For example, three-level power modules configurations are known in which positive and negative DC power supplies are provided together with a ground connection.

Figure 17:
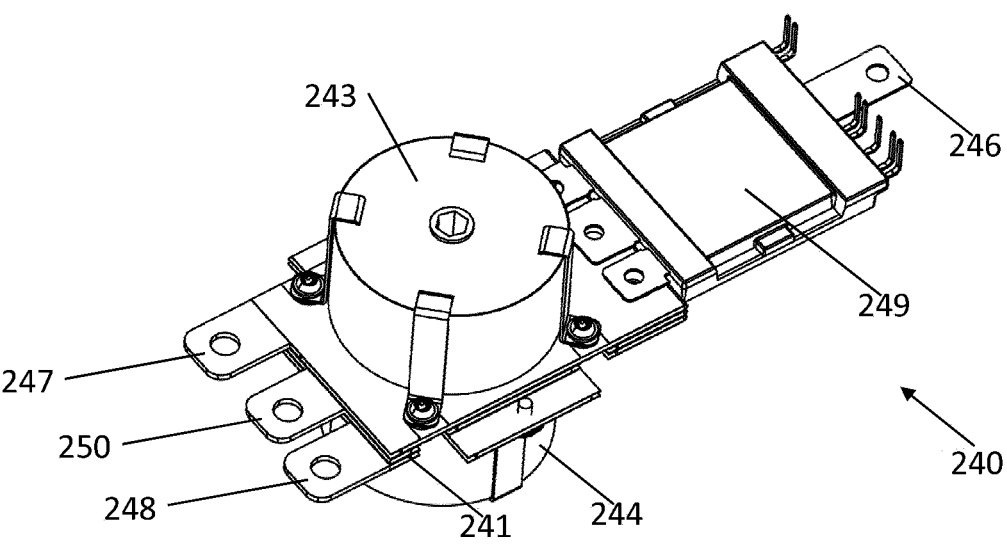
FIGS. 17 and 18 show circuits in accordance with an example of a three-level DC embodiment.

FIG. 17 shows a circuit, indicated generally by the reference numeral 240, in accordance with an example embodiment wherein a three-level DC configuration is utilised. The circuit 240 comprises a first conductor structure

241. This may be similar to conductor the structures 11 and 31, but here it comprises three separated conductors for positive, neutral and negative DC inputs. A plurality of capacitors may be arranged in a plurality of levels on the conductor structure 241. A DC power module 249 is provided on the first conductor structures 241. Terminals 247, 248 and 250 are used for the two DC power inputs and the neutral level, and the terminal 246 provides the AC outputs from the power module 249. A capacitor 243 is mounted in a first capacitor level on a first side of the first conductor structure 241; and a capacitor 244 is mounted in a second capacitor level on a second side of the first conductor structure 241. The plurality of capacitors 243, 244 in the plurality of levels are mounted symmetrically opposite to each other.

Figure 18:
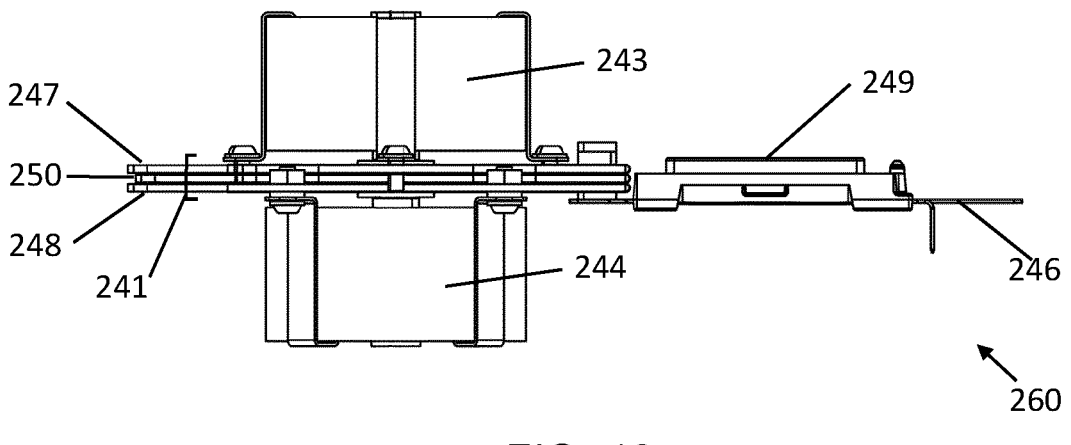

FIG. 18 shows a side view, indicated generally by the reference numeral 260, of the circuit 240 in accordance with an example embodiment. The side view 260 shows the first conductor structure 241, and the first and second levels of capacitors 243 and 244, as mounted on the conductor structure 241, as described above with reference to FIG. 17.

It will be readily apparent to those of ordinary skill in the art that the three-level power modules described above are provided by way of example only. The principles described herein are applicable to alternative three-level power module configurations.

Figure 19:
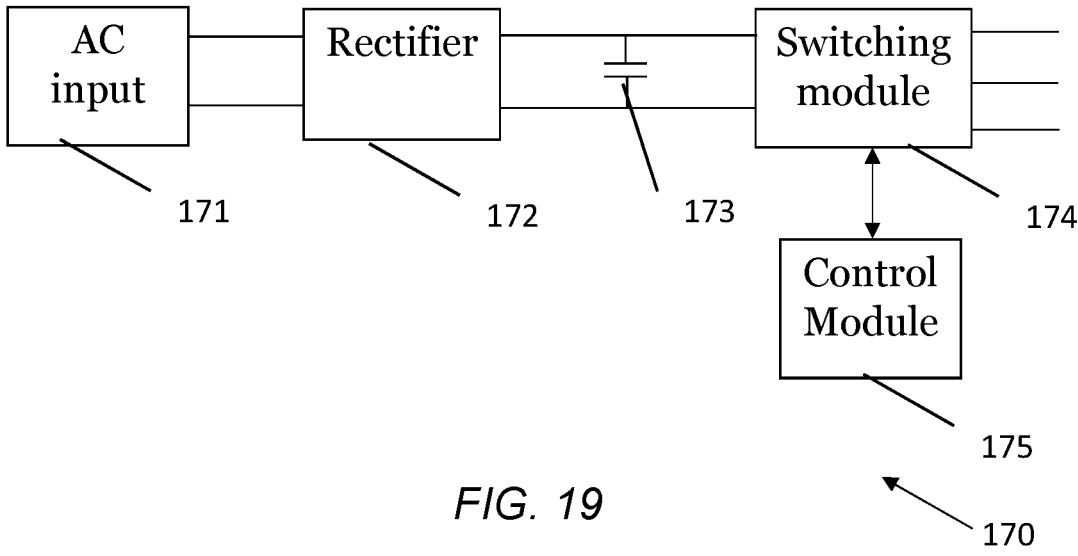
FIG. 19 is a block diagram of an inverter circuit used in example embodiments.

FIG. 19 is a block diagram of an inverter circuit, indicated generally by the reference numeral 170, used in example embodiments. The inverter circuit 170 may comprise an AC input 171, a rectifier 172 for converting an AC power source into a DC signal, and a DC storage capacitor 173. The inverter circuit may further comprise a switching module 174 (similar to the switching module 160) and a control module 175 for controlling the switching of the plurality of switching components. The circuits described above may be used to implement the switching module 174, with the DC voltage across the DC storage capacitor providing the DC inputs to the busbars.

Some of the advantages of the example embodiments described above, comprising at least a pair of capacitors mounted opposite to each other having a common axis, comprise:

Increased capacitance in a given volume
 capacitor terminals being accessible from both side of the bus bar using traditional screws
 reduced inductance
 the capacitors acting as a heat-sink improving the thermal performance as well as the heat dissipation for heat produced by current flow in the busbar
 circuit layout can be adapted to any DC-multi-terminal power module
 simplifying mechanical assembly for modular design
 maximizing RMS current at the rated temperature
 achieving a compact modular structure (e.g. for automotive applications)
 flexible building blocks that are easy to scale up/down
 improved current density distribution
 lower commutation inductance (e.g. 2.3 nH measured at the terminals of the power modules)

The embodiments of the invention described above are provided by way of example only. The skilled person will be aware of many modifications, changes and substitutions that could be made without departing from the scope of the present invention. The claims of the present application are intended to call all such modifications, changes and substitutions as fall within the spirit and scope of the invention. For example, the principles described herein are applicable to a wide variety of semiconductor components (not just power modules and power module components).

What is claimed is:

1. An apparatus comprising:
 a conductor structure comprising a first electrical connection and a second electrical connection;
 a first capacitor pair comprising a first capacitor and a second capacitor mounted directly opposite each other on opposite sides of the conductor structure, wherein the first and second capacitors each have a first electrical connector and a second electrical connector having a first electrical capacitance therebetween, and wherein the first and second capacitors each have a first side and a second side opposite the first side;
 a first connection arrangement connecting the first electrical connector of the first capacitor and the first electrical connector of the second capacitor to the first electrical connection of the conductor structure, wherein the first electrical connectors are provided on the first sides of the first and second capacitors, respectively, and are aligned on the opposite sides of the conductor structure;
 a second connection arrangement connecting the second electrical connector of the first capacitor and the second electrical connector of the second capacitor to the second electrical connection of the conductor structure, wherein the second electrical connectors are provided on the second sides of the first and second capacitors, respectively, and are aligned on the opposite sides of the conductor structure;
 a second capacitor pair comprising a third capacitor and a fourth capacitor mounted directly opposite each other on opposite sides of the conductor structure, wherein the third and fourth capacitors of the second capacitor pair each have a third electrical connector and a fourth electrical connector having a second electrical capacitance therebetween, and wherein the third and fourth capacitors each have a third side and a fourth side opposite the third side;
 a third connection arrangement connecting the third electrical connector of the third capacitor and the third electrical connector of the fourth capacitor of the second capacitor pair to the first electrical connection of the conductor structure, wherein the third electrical connectors are provided on the third sides of the third and fourth capacitors, respectively, and are aligned on the opposite sides of the conductor structure; and
 a fourth connection arrangement connecting the fourth electrical connector of the third capacitor and the fourth electrical connector of the fourth capacitor of the second capacitor pair to the second electrical connection of the conductor structure, wherein the fourth electrical connectors are provided on the fourth sides of the third and fourth capacitors, respectively, and are aligned on the opposite sides of the conductor structure.

2. The apparatus as claimed in claim 1, wherein the conductor structure is a busbar.

3. The apparatus as claimed in claim 2, wherein the conductor structure has a first layer in electrical contact with the first electrical connection of the conductor structure and a second layer in electrical contact with the second electrical connection of the conductor structure.

4. The apparatus as claimed in claim 1, wherein the conductor structure has a first layer in electrical contact with the first electrical connection of the conductor structure and a second layer in electrical contact with the second electrical connection of the conductor structure.

5. The apparatus as claimed in claim 4, wherein one of the first and second layers is a positive DC layer and the other of the first and second layers is a negative DC layer.

6. The apparatus as claimed in claim 4, wherein the conductor structure has a third layer and a third electric connection, wherein the third layer is in electrical contact with the third electrical connection of the conductor structure.

7. The apparatus as claimed in claim 6, wherein the third layer is an electrical ground layer.

8. The apparatus as claimed in claim 1, wherein the first and second electrical connectors of the first capacitor are each accessible from both the first and the second sides of the first capacitor, wherein the first and second electrical connectors of the second capacitor are each accessible from both the first and the second sides of the second capacitor, wherein the second sides of the first and second capacitors are adjacent to the conductor structure.

9. The apparatus as claimed in claim 1, wherein the first electrical connector of the first capacitor of the first capacitor pair forms part or all of a first electrical connector structure of the first capacitor that extends from the first side of the first capacitor to the second side of the first capacitor, and wherein the first electrical connector of the second capacitor of the first capacitor pair forms part or all of a first electrical connector structure of the second capacitor that extends from the first side of the second capacitor to the second side of the second capacitor.

10. The apparatus as claimed in claim 9, wherein each capacitor of the first capacitor pair comprises a hole extending axially within the capacitor from the first side to the second side, wherein the first electrical connector structure of the first capacitor is provided within said hole of the first capacitor, and wherein the first electrical connector structure of the second capacitor is provided within said hole of the second capacitor.

11. The apparatus as claimed in claim 9, wherein the first electrical connector structure of the first capacitor extends along a central axis of the first capacitor, and wherein the first electrical connector structure of the second capacitor extends along a central axis of the second capacitor.

12. The apparatus as claimed in claim 9, wherein the second electrical connector of the first capacitor is at least partially provided on an exterior of a casing of the first capacitor, such that the second electrical connector is accessible from both the first and the second sides of the first capacitor, and wherein the second electrical connector of the second capacitor is at least partially provided on an exterior of a casing of the second capacitor, such that the second electrical connector is accessible from both the first and the second sides of the second capacitor.

13. The apparatus as claimed in claim 12, wherein the second electrical connector of the first capacitor has multiple sections, each of the multiple sections of the second electrical connector of the first capacitor separately accessible from both the first and second sides of the first capacitor, wherein the multiple sections of the second electrical connector of the first capacitor are provided symmetrically about the first capacitor, and wherein the second electrical connector of the second capacitor has multiple sections, each of the multiple sections of the second electrical connector of the second capacitor separately accessible from both the first and second sides of the second capacitor, wherein the multiple sections of the second electrical connector of the second capacitor are provided symmetrically about the second capacitor.

14. An electrical capacitor as claimed in claim 13, wherein the multiple sections of the second electrical connector of the first capacitor meet at a flange that extends around one end of the first capacitor, and wherein the multiple sections of the second electrical connector of the second capacitor meet at a flange that extends around one end of the second capacitor.

15. The apparatus as claimed in claim 1, further comprising:

a first switching component having a first terminal in electrical contact with the first electrical connection of the conductor structure and a second terminal in electrical contact with a first output;

a second switching component having a first terminal in electrical contact with the first output and a second terminal in electrical contact with the second electrical connection of the conductor structure; and a control circuit for controlling the switching of the first and second switching components.

16. The apparatus as claimed in claim 1, further comprising:

a plurality of first switching components, each having a first terminal in electrical contact with the first electrical connection of the conductor structure and a second terminal in electrical contact with one of a plurality of outputs;

a plurality of second switching components, each having a first terminal in electrical contact with one of the plurality of output and a second terminal in electrical contact with the second electrical connection of the conductor structure; and a control circuit for controlling the switching of the plurality of switching components.

17. An inverter comprising:

a rectifier for converting an AC power source into a DC signal;

a DC storage capacitor; and the apparatus as claimed in claim 15, wherein the DC signal is provided across the first and second electrical connections of the conductor structure.

18. An apparatus comprising:

a conductor structure comprising a first electrical connection and a second electrical connection;

a first capacitor pair comprising a first capacitor and a second capacitor mounted directly opposite each other on opposite sides of the conductor structure, wherein the first and second capacitors each have a first electrical connector and a second electrical connector having a first electrical capacitance therebetween, and wherein the first and second capacitors each have a first side and a second side opposite the first side;

a first connection arrangement connecting the first electrical connector of the first capacitor and the first electrical connector of the second capacitor to the first electrical connection of the conductor structure, wherein the first electrical connectors are provided on the first sides of the first and second capacitors, respectively, and are aligned on the opposite sides of the conductor structure; and a second connection arrangement connecting the second electrical connector of the first capacitor and the second electrical connector of the second capacitor to the second electrical connection of the conductor structure, wherein the second electrical connectors are provided on the second sides of the first and second capacitors, respectively, and are aligned on the opposite sides of the conductor structure;

wherein the conductor structure has a first layer in electrical contact with the first electrical connection of the conductor structure and a second layer in electrical contact with the second electrical connection of the conductor structure, and wherein the first and second layers are arranged on respective upper and lower sides of the structure and are aligned on the respective upper and lower sides of the conductor structure.

19. The apparatus as claimed in claim 18, wherein the conductor structure has a third layer and a third electric connection, wherein the third layer is in electrical contact with the third electrical connection of the conductor structure.

* * * * *